Nov. 8, 1932.        A. ROSENTHAL        1,886,905
CONVEYER FOR CORN HUSKERS
Filed June 20, 1930
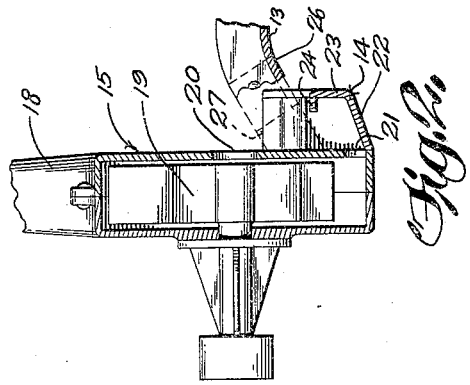
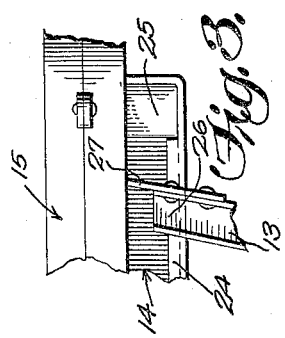
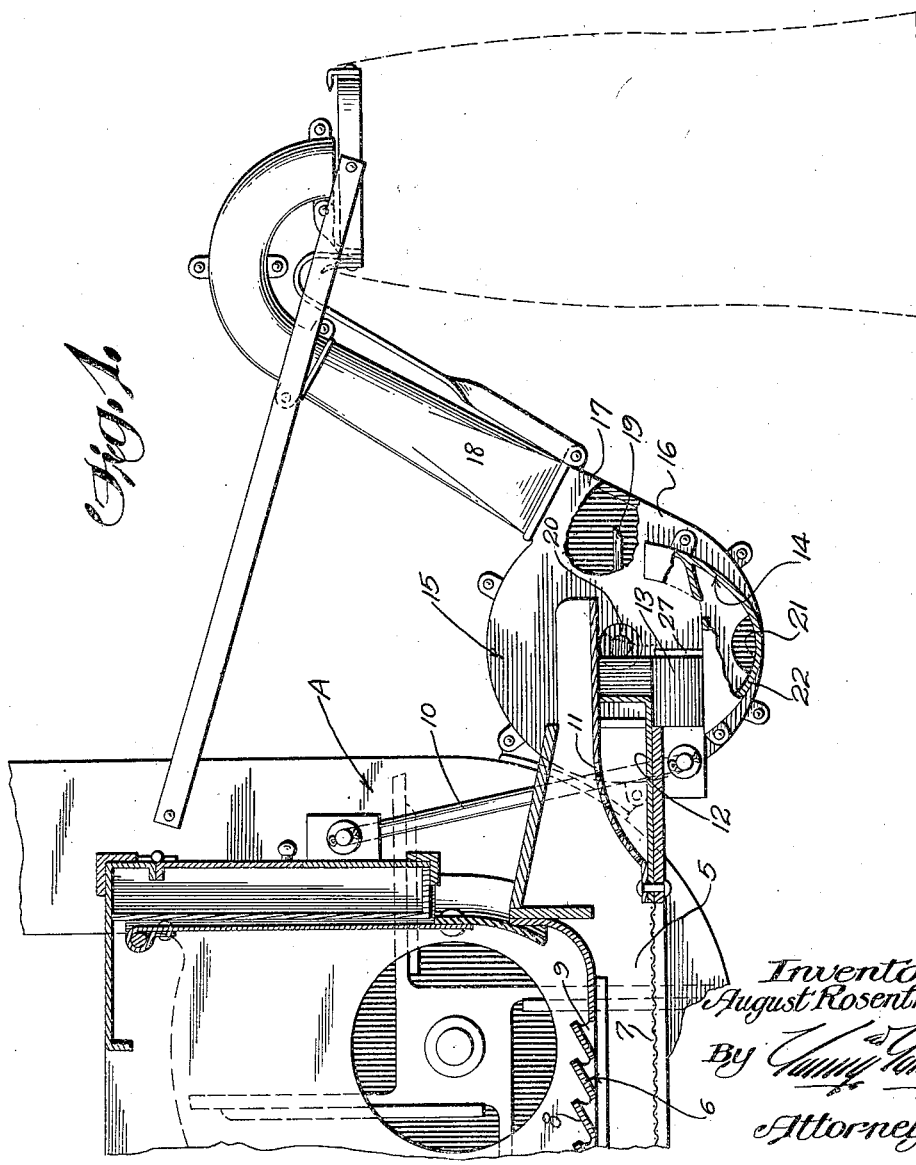
Inventor
August Rosenthal
By
Attorneys Patented Nov. 8, 1932

1,886,905

UNITED STATES PATENT OFFICE

AUGUST ROSENTHAL, OF WEST ALLIS, WISCONSIN, ASSIGNOR TO ROSENTHAL MANUFACTURING COMPANY, OF WEST ALLIS, WISCONSIN

CONVEYER FOR CORN HUSKERS

Application filed June 20, 1930. Serial No. 462,572.

This invention appeartains to corn huskers and more particularly to the bagger blower construction thereof and is an improvement over my prior Patent 1,672,501 issued to me June 5, 1928.

One of the primary objects of my present invention is the provision of novel means for confining the delivered corn kernels to the kernel receiving cup of the blower, whereby all danger of the kernels bouncing from the cup and toward the air inlet of the blower is eliminated, thereby insuring the keeping of said air inlet clear and unobstructed.

Another object of my invention is the provision of a lip formed on and overlying the outermost end of the cup and extending toward the lateral wall flange of the cup, said lip and flange acting in conjunction with one another to confine the kernels in the cup. The lip being inclined toward the kernel inlet of the blower for directing the kernel toward said kernel inlet.

A further and important object of my invention is the provision of a flexible wiper strip carried by the delivery trough for the kernels and movable therein back and forth over the top of the cup and the face of the blower, said strip functioning to insure the proper delivering of the kernels into the cup and to prevent the bouncing of the kernels toward the blower air inlet opening and to effectively prevent the entrance of trash toward the air inlet opening and the accumulation of trash adjacent to said air inlet opening.

With these and other objects in view the invention consists in the novel construction, arrangement and formation of parts, as will be hereinafter more specifically described, claimed and illustrated in the accompanying drawing:

Figure 1 is a sectional view through a corn husker showing the blower in place with parts thereof broken away and in section.

Figure 2 is a vertical section through the blower with the delivery trough in operative position relative thereto.

Figure 3 is a fragmentary top plan view of the blower and delivery trough illustrating my novel arrangement of retaining lip and flexible wiper.

Referring to the drawing in detail herein, similar reference characters designate corresponding parts throughout the several views. The letter A generally indicates a corn husker of the type described in my prior Patent No. 1,629,930, issued May 24, 1927.

As shown this corn husker is provided with a shaker trough 5 having a main bottom 6 and a screen bottom 7 spaced below the main bottom. The main bottom 6 is provided with upper structural projections 8 and with adjacent openings 9 through which the grains of corn inadvertently shelled by the husker may drop onto the screen bottom 7, where the same temporarily rests. This shaker trough is reciprocated back and forth and is supported by swinging links 10. This screen 7 is adapted to separate dust and dirt from the kernels of corn and the kernels of corn travel over an apertured partition 11 through which the kernels or grains of corn drop into a trough like space 12. Any small cut material that may be carried with the grains of corn will pass over the apertures of partition 11 and be discharged from the machine.

The bottom of the head portion of the shaker trough 6 below the apertured partition plate 11 carries the lateral extending downwardly inclined delivery trough 13 which terminates directly above the corn receiving cup 14 of the bagger blower 15. This bagger blower 15 is rigidly secured to the corn husker and includes a casing 16 having the tangential outlet 17 which has communicating therewith the bagger pipe 18. The casing 16 rotatably carries the blower fan 19 and the casing is provided with the axial inlet air opening 20 and a bottom kernel inlet opening 21. The kernel inlet opening 21 communicates with the lower end of the cup 14 so that the kernels of corn will be sucked into the blower from said cup. The openings 20 and 21 are in definite position relative to one another as described in my prior Patent 1,672,501 heretofore referred to and the blower functions in the same manner as in said mentioned patent.

It is to be noted that the lower wall 22 of the cup 14 is of arcuate shape in side elevation and inclining downwardly toward the kernel inlet opening 21. As in my mentioned patent the outer wall 23 of cup 14 is provided with an inturned laterally extending flange 24 for preventing the outward bouncing of the grains or kernels of corn. The outer end wall of the cup is provided with a downwardly inclined kernel retaining lip 25 which extends entirely across the cup from the side wall 23 thereof to the outer face of the casing 16 of the blower.

It is to be noted that this lip 25 extends toward and terminates adjacent to the flange 24. The delivery trough or chute 13 is provided with a depending extension 26 which overhangs the flange 24 and this depending extension acts to lead the corn kernels into the cup.

From the description so far it is obvious that as the delivery chute travels back and forth over the cup with the shaker trough 5 the grains or kernels of corn will be delivered into the cup and that the inclined lower wall 22 thereof will guide the kernels toward the kernel receiving aperture 21 of the blower casing. The lip 25 inclining downwardly toward this aperture will effectively guide any of the grains of corn tending to bounce from the end of the cup back toward the aperture 21, while the flange 24 will prevent the outward bouncing of the corn kernels over the side of the cup.

Acting in conjunction with the lip 25 and flange 24 to prevent the displacement of the corn kernels from the cup I provide a flexible flap or strip 27 carried by the downwardly turned end 26 of the delivery chute 13. This flexible flap 27 can be formed of rubber, if preferred, and extends into the cup and into wiping contact with the face of the blower above the aperture 21 and below the air inlet opening 20. This flexible flap 27 working back and forth over the cup with the delivery chute 13 acts to confine and beat down any kernels of corn tending to bounce in the cup and effectively prevents these kernels of corn from entering the air inlet opening 20 of the blower, thereby keeping this opening clear and unobstructed.

Incident to the operation of the corn husker in the field, trash and particles of matter tend to accumulate in and around the cup 14. The provision of the wiper strip 27 prevents the accumulation of this trash and clears the trash away and precludes the entrance of the trash into the blower inlet opening 20. This keeps the opening 20 clear at all times.

While I have shown the wiper strip below the opening 20, it is obvious that the same can extend across the opening or partly below the same. Likewise the wiper strip can be carried by any moving part of the machine providing the strip is given its wiping action.

From the foregoing description it can be seen that I have provided an efficient means for retaining kernels of corn in the cup which may be delivered thereto and thereby insuring the proper operations of the corn kernel blower.

Changes in details may be made without departing from the spirit or the scope of this invention but what I claim as new is:

1. In a device of the class described, a shaker trough provided with a discharge head, a blower having a casing provided with a receiving inlet, a cup carried by the casing housing said inlet for receiving material from the discharge head irrespective of the position thereof, and a flexible stripping carried by a part of said discharge head extending over and into the cup for beating down any delivered material bouncing in said cup.

2. In a device of the class described, a shaker trough provided with a discharge head including a laterally extending delivery chute, a blower having a casing provided with an air inlet opening and a material receiving aperture, a cup carried by the casing housing said aperture, the delivery chute overhanging the cup and delivering material thereto irrespective of its position over the cup, and a flexble strip carried by and movable with the delivery chute having wiping contact with the casing of the blower intermediate the air inlet opening and the material receiving aperture.

3. In a device of the class described, a shaker trough provided with a discharge head, said discharge head including a laterally extending delivery chute, a blower having casing located at one side of the delivery chute provided with an air inlet opening and a material receiving aperture, a cup carried by the casing housing the aperture and for receiving material from the delivery chute irrespective of the position of the delivery chute relative thereto, a laterally extending flange carried by the outer wall of the cup overhung by said delivery chute, a downwardly inclined lip on the outer end wall of the cup leading toward the aperture, and a flexible strip carried by the delivery chute for movement over the cup and for wiping contact with the outer face of the casing intermediate the air inlet opening and the material receiving aperture.

4. In a device of the class described, a shaker trough provided with a discharge head, a blower having a casing provided with an air inlet opening and a material receiving aperture, a cup carried by the casing housing said aperture, and a flexible strip carried by and movable with the shaker trough having wiping contact with the face of the casing of the blower above the cup.

5. In a device of the class described, a blower having an air inlet and a material receiving opening, a reciprocating material delivery chute for the blower, and a wiper movable with the chute engaging the face of the blower between said inlet and material receiving opening for keeping the air inlet clear.

In testimony that I claim the foregoing I have hereunto set my hand at West Allis, in the county of Milwaukee and State of Wisconsin.

AUGUST ROSENTHAL.